June 24, 1969   R. L. CRAVENS   3,451,690
GOLF CLUB CART

Filed Dec. 19, 1966   Sheet 1 of 3

*INVENTOR.*
RAYMOND L. CRAVENS

INVENTOR.
RAYMOND L. CRAVENS

INVENTOR.
RAYMOND L. CRAVENS

United States Patent Office 3,451,690
Patented June 24, 1969

3,451,690
GOLF CLUB CART
Raymond L. Cravens, 43 Highland Drive,
Bowling Green, Ky. 42101
Filed Dec. 19, 1966, Ser. No. 602,895
Int. Cl. B62d 21/18; B62b 1/04, 1/20
U.S. Cl. 280—40                                                       4 Claims

ABSTRACT OF THE DISCLOSURE

This invention relates to a golf club cart having supporting wheels which are fully retractable into the chassis of the cart to facilitate storage of the cart when not in use. The cart also includes two separate storage areas, one for the iron clubs, and the other for the wood clubs. The storage areas are so constructed that the wood heads are disposed at one end of the cart and the iron heads are disposed at the opposite ends of the cart to distribute the clubs and balance their weight in the cart. Moreover, all the clubs in the storage areas are readily accessible to the player.

---

This invention relates to a golf club cart, and more particularly to a golf club carrier having retractable wheels.

Although many devices have been designed for supporting and transporting golf clubs on a golf course and for conveniently arranging the clubs for use, most devices are designed to support the clubs in either an upright or horizontal position during transportation, and in an upright position when the clubs are removed and restored during play. Moreover, most golf clubs receptacles or carriers are designed for axial or lengthwise movement of the clubs into and out of the receptacle.

It is therefore, an object of this invention to provide a golf club cart having a club storage area from which the clubs may be removed and into which they may be placed with a minimum of time and effort.

Another object of this invention is to provide a golf club cart in which the chassis for supporting the clubs and the club receiving means are constructed to balance the clubs over the running gear to facilitate transportation and handling.

A further object of this invention is to provide a golf club cart having two club storage areas, one especially designed for the irons, and the other especially adapted for the woods, so that each club is readily accessible to the player.

Another object of this invention is to provide a golf club cart having wheels to support the cart in running position and retractible to stored positions concealed within the cart.

A further object of this invention is to provide a golf club cart having a retractible handle.

Further objects and advantages of the invention will be apparent from the following description taken in conjunction with the drawings, wherein.

Figure 1:
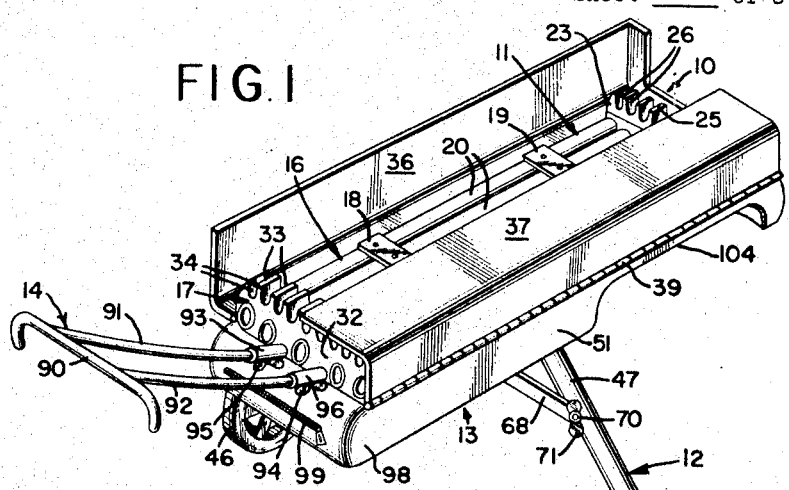
FIG. 1 is a top front perspective view of the invention in running position, with the cover means partially open and with the clubs removed.

Referring now to the drawings in more detail, the golf club cart 10 made in accordance with this invention includes a golf club storage chassis 11, running gear 12, running gear storage housing 13 and handle means 14.

Figure 3:
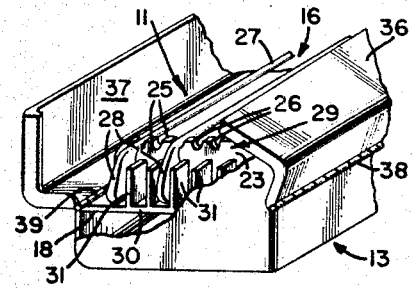
FIG. 3 is a fragmentary perspective view of the rear end of the chassis partially broken away and with the cover means partially open to show iron clubs in the upper storage area.
Figure 7:
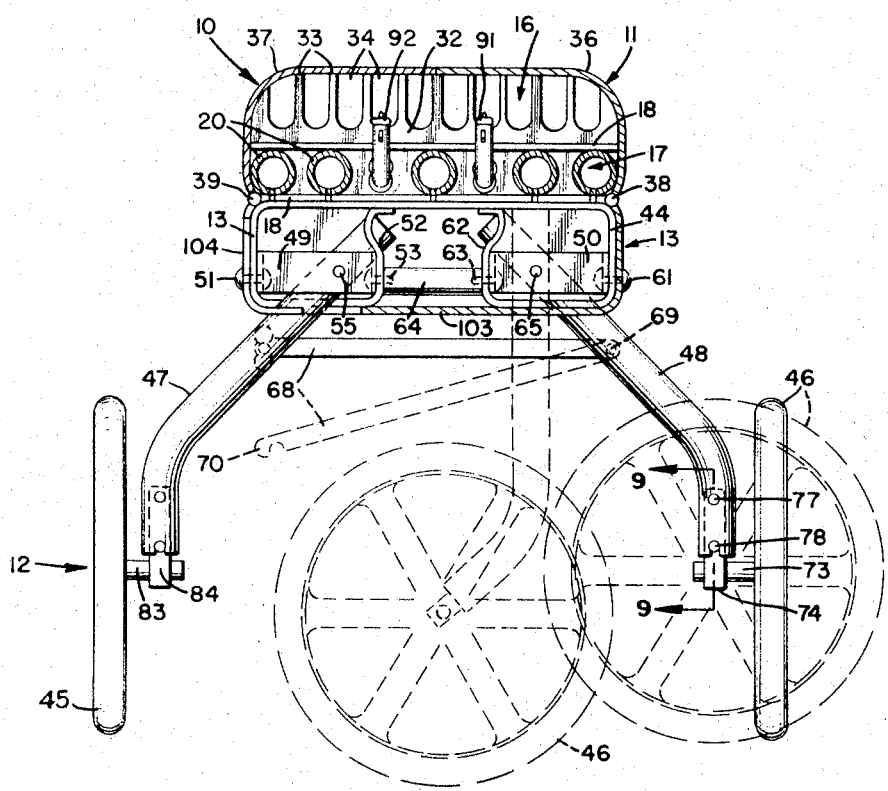
FIG. 7 is a section taken along the line 7—7 of FIG. 5, with intermediate positions of the running gear shown in phantom.

As best disclosed in FIGS. 1, 3 and 7, the club storage chassis 11 comprises an upper club storage area 16, and a lower club storage area 17. The lower storage area 17 comprises a plurality of spaced apart parallel tubes 20 rigidly held by transverse bars or straps 18 and 19. The tubes 20 are of slightly greater diameter than, and extend substantially the same length of, the shafts 21 of the wood clubs, so that the wood club heads 22 will extend from the forward ends of the tubes 20, as best disclosed in FIG. 4. The rear ends of the tubes 20 terminate at the rear wall 23.

Figure 5:
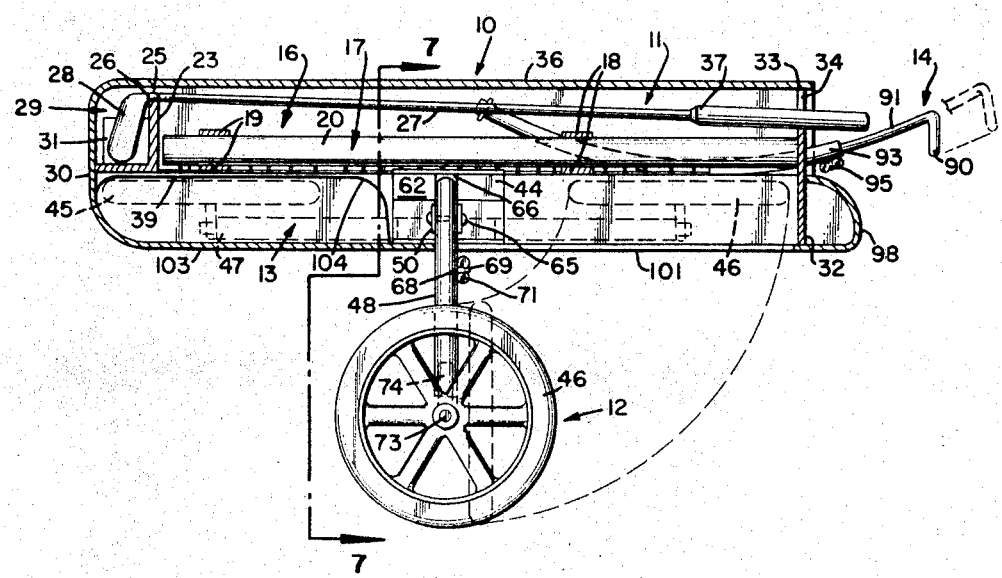
FIG. 5 is a section taken along the line 5—5 of FIG. 6, showing the running gear in running position in solid lines and in intermediate and storage postions in phantom, and disclosing different operative positions of the handle means.

The rear wall 23 projects upwardly into the upper storage area 16 comprising a plurality of transversely spaced rear dividers 25 forming channel members 26 for receiving the shafts 27 of the iron clubs. As best disclosed in FIGS. 3 and 5, a trough 29 to receive the heads 28 of the iron clubs, is defined by the rear wall 23 and a rearwardly extending bottom wall 30 fixed to the running gear housing 13. Divider strips 31 may also be used in the troughs 29, if desired, to separate the club heads 28.

Projecting upwardly from the housing 13 at the forward end of the cart 10 is front wall 32 through which the forward ends of the tubes 20 extend and are secured. Moreover, the upper portion of the front wall 32 comprises a plurality of transversely spaced front dividers 33 forming the front channel members 34, of the same construction as the rear channel members 26, to support the iron club shafts 27, as best disclosed in FIG. 4.

The club storage chassis 11 further comprises a top cover member, such as the elongated covers 36 and 37, pivotally connected by the hinges 38 and 39, respectively, to the top edges of the running gear housing 13, and shaped to fit over the storage chassis 11 and meet in closed position to completely encase the upper storage area 16.

Figure 4:
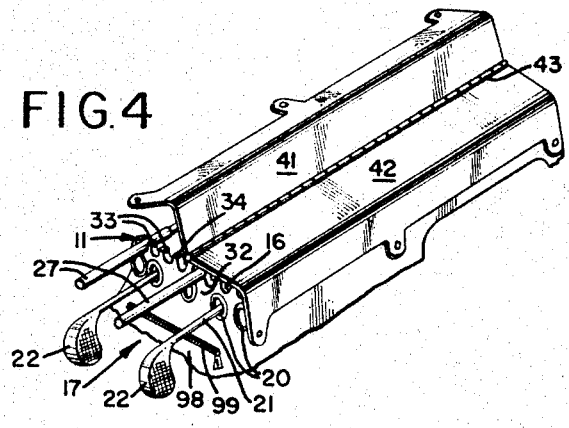
FIG. 4 is a fragmentary top perspective view of the chassis having a modified cover means, and showing the relative positions of the irons in the upper storage area and the woods in the lower storage area.

FIG. 4 discloses a modified cover member incorporating a pair of covers 41 and 42 pivotally connected to the top of the storage chassis 11' by means of a single longitudinal hinge 43.

The running gear 12 includes a left wheel 45 and a right wheel 46, supported by left strut 47 and right strut 48, respectively, beneath the chassis 11. Fixed transversely between the side walls of the running gear housing 13, beneath the tubes 20 and substantially midway between the opposite ends of the cart 10 is a wheel journal bracket 44. The journal bracket 44 includes a pair of journal members 49 and 50, each of which is in the form of an open rectangular frame. The left end of journal member 49 is journalled to the left side of the bracket 44 and housing 13 by means of pivot pin 51, and the right end of journal member 49 is journalled to an inner depending wall 52 by means of pivot pin 53 coaxially aligned with pivot pin 51. The upper portion of the left strut 47 extends through the open frame journal member 49 and is secured thereto by a pivot pin 55 for pivotal movement of the strut 47 about an axis normal to the pivotal axis of the pins 51 and 53. The inner journal wall 52 is provided with an opening or channel slot 56 to receive the inner end of the strut 47 and prevent movement of the strut 47 longitudinally of the chassis 11 when the wheel 45 is in running position. However, the size and the position of the channel slot 56 are such that when the lower portion of the strut 47 is moved inwardly of the cart 10, the upper end of the strut 47 pivots outwardly about the pin 55 to become entirely disengaged from the opening 56. The strut 47 and journal member 49 are then free to pivot about the transverse axis of the pins 51 and 53.

In a similar manner, the right end of the journal member 50 is pivoted to the right side wall of the bracket 44 and housing 13 by means of the pivot pin 61, and the left end of the journal member 50 is pivoted to the inner depending journal wall 62 by means of pivot pin 63. In order to strengthen the construction of the journal members, the journal walls 52 and 62 are connected by a tubular strut 64, coaxial with the pivot pins 51, 53, 63, and 61. The upper portion of the strut 48 extends through the open portion of journal frame member 50 and is connected thereto by pivot pin 65, the axis of which is normal to the axis of the pivot pins 61 and 63. The depending journal wall 62 is also provided with opening or channel slot 66 for receiving the inner or upper end of the strut 48 when the strut 48 is in running position, in order to constrain the movement of the strut 48 longitudinally of the chassis 11. Since the bottoms of the channel slots 56 and 66 engage the upper portions of the struts 47 and 48, respectively, in running position, the wheels 45 and 46 are limited against outward movement.

In order to restrain the wheels 45 and 46 against inward and outward movement in running position, an elongated latch arm 68 is pivotally connected by pin 69 to the right strut 48. The opposite end 70 is hooked to engage a bolt in the left strut 47 and be secured by the Wing nut 71.

Figure 9:
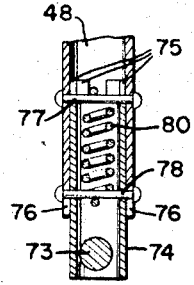
FIG. 9 is a section taken along the line 9—9 of FIG. 7.
Figure 8:
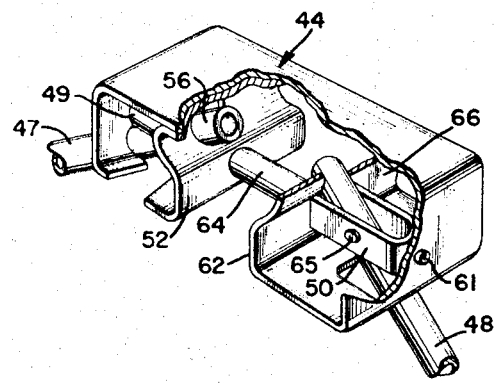
FIG. 8 is a fragmentary perspective view of the journal means for the upper ends of the wheel struts.

As best disclosed in FIGS. 7 and 9, wheel 46 is rotatably secured to axle 73, which is fixed to the lower portion of the locking cylinder 74. The locking cylinder 74 is provided with four notches 75 on its upper edge spaced substantially 90° apart, and is adapted to be telescopingly received in the open end of the straight lower or outer end of the strut 48, which is also hollow and tubular. Slots 76 are also formed 90° part in the bottom edge of the strut 48 and open downwardly. Fixed diametrically through the lower portion of the strut 48 is a locking pin 77, adapted to engage a diametrically opposite pair of slots 75 in the locking cylinder 74. Another locking pin 78 is fixed diametrically through the locking cylinder 74 and projects slightly outwardly from the walls of the locking cylinder 74 in order to engage opposed slots 76 in the bottom of the strut 48. It will be noted that the vertical spacing of the locking pins 77 and 78 and the vertical spacing of the slots 75 and 76 are such that the locking pin 77 will engage opposed slots 75 at the same time that locking pin 78 will engage opposed slots 76. The locking pins 77 and 78 are connected by a coil spring 80 in tension in order to bias the locking pins 77 and 78 into locking engagement with the respective slots 75 and 76. Thus, the slots 75 and 76 are formed so that the wheel 46 may be maintained either in its running position disclosed in solid lines in FIG. 7, or in the phantom position 46′ of FIG. 7 at 90° to the running position of the wheel 46. Accordingly, the wheel 46 is manipulated between these 90° positions by pulling downwardly upon the axle 73 to remove both locking pins 77 and 78 from their corresponding slots 75 and 76, rotating the axle 73, and consequently the locking cylinder 74 through 90°, and releasing the axle 73 so that the spring 80 will bias the locking cylinder 74 upwardly again into locking position, with the pins 77 and 78 engaging the opposed pairs of slots 75 and 76 at right angles to those slots engaged in running position.

The left wheel 45 is also rotatably mounted upon its axle 83 which is fixed to a locking cylinder 84 constructed and connected to the lower straight portion of the strut 47, in the same manner as the axle 73 and locking cylinder 74.

The handle means 14 may be constructed as shown, including a transverse handle bar 90 having a pair of arcuate rods 91 and 92, extending rearwardly from the handle bar 90 and telescopingly received in the tubular sockets 93 and 94, respectively, fixed in the front wall 32. The tubular sockets 93 and 94 are open at both ends and are provided with transverse set screws 95 and 96, respectively, for releasably securing the rods 91 and 92 in various axially adjusted positions, so that the handle means 14 may be lengthened or shortened as desired for pulling or pushing the cart 10.

The front end of the wheel housing 13 can be constructed in the form of a hollow compartment 98, preferably of collapsible or flexible material with a transverse opening secured by a slide fastener 99 to contain golf accessories, such as balls and tees.

The operation of the invention is as follows:

In the running position of the cart 10, the handle means 14 may be extended by the golfer and locked in the desired position by the set screws 95 and 96. The wheels 45 and 46 are in vertical parallel positions for engaging the ground, with their axles 73 and 83 locked in a coaxial position by the locking cylinders 74 and 84 in the bottom or outer ends of the struts 47 and 48. As shown, particularly in FIG. 7, the struts 47 and 48 may be bent as shown with the upper portions converging upwardly and inwardly so that the inner ends of the struts 47 and 48 are locked against longitudinal movement with their corresponding channel openings 56 and 66. This locking relationship between the upper ends of the struts 47 and 49 and the channel slots 56 and 66 prevents rotation about the transverse axes of the pivot pins 51, 53, 63 and 61. Moreover, the bottoms of the slots 56 and 66 are adapted to engage the upper portions of the struts 47 and 48 to prevent outward movement of the wheels 45 and 46. In addition, the latch arm 68 is secured by the wing nut 71 in its transverse latched position, as disclosed in solid lines in FIGS. 1 and 7.

With the wood club shafts 21 inserted into the tubes 20 in the lower storage area 17, and the iron shafts 27 resting in their corresponding channel members 26 and 34 in the upper storage area 16 and the iron club heads 28 depending in the trough 29, the cart 10 is ready for transportation and play.

As the golfer or player pulls the cart 10 by means of the handle bar 90, all of his strength is efficiently utilized in the sole movement of the cart over the ground, or in the other words, practically all of his efforts are directed in overcoming the friction of the wheels 45 and 46 against the ground and the inertia of the cart 10, because the chassis 11 is so well-balanced. The middle portion of the chassis 11 is directly over the wheels 45 and 46 and struts 47 and 48, and the wood heads 22 and iron heads 28 are located at opposite ends of the chassis 11 to distribute the weight of the clubs on opposite sides of the transverse pivotal axis defined by the pins 51, 53, 61 and 63. Consequently, the center of gravity of the load of the cart 10 is located as nearly as possible to the plane of the wheel axles 73 and 83. Therefore, very little effort is expended by the player in either lifting or depressing the handle bar 90 in order to overcome any turning moments about the wheel axles created by an unbalanced cart or unbalanced club loads.

When the player is ready to use a club, the rear end of the chassis is lowered to rest upon the ground, forming a three-point support with the two wheels 45 and 46. The player then opens the hinged covers 36 and 37, or the hinged covers 41 or 42 in FIG. 4, to expose the iron clubs. If he desires an iron club 27–28, the player merely identifies the iron which he desires in the upper storage area 16 and lifts it transversely from the channel members 26 and 34. If a wood club 21–22 is desired, it is pulled from the corresponding tube 20 either horizontally from a level cart 10, upwardly from a tilted cart. By having the two storage areas 16 and 17 one above the other, not only are the weights of the clubs better balanced and arranged in a more compact area, but the clubs may be widely separated so that they may be more easily identified, removed and replaced. Moreover, since the iron clubs are used more frequently than wood clubs, the iron clubs are preferably located in the upper storage area 16 which is more accessible to the player than the lower storage area 17.

After the player has used an iron club 27–28, he replaces it in its proper channel members 26 and 34 in the upper storage area 16, closes the cover or covers 36 and 37 and pulls the cart 10 by the handle bar 90 to his next playing position.

Figure 2:
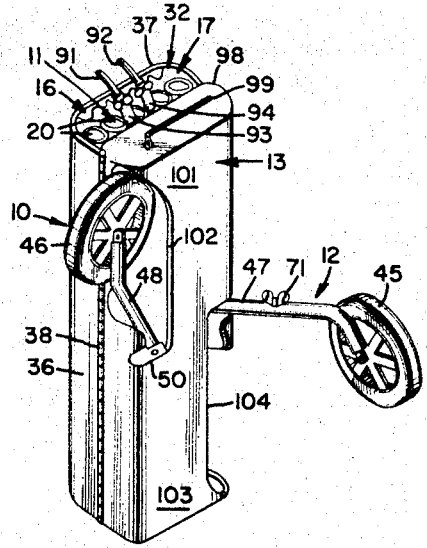
FIG. 2 is another perspective view of the invention supported upright on the rear end wall, and with the wheels between running position and the stored position.

When the cart 10 is not in use and is to be stored, it may be placed in an upright position upon its rear end, as disclosed in FIG. 2. The handle means 14 may be completely removed from the sockets 93 and 94, or the set screws 95 and 96 may be loosened and the rods 91 and 92 thrust into the sockets 93 and 94 as far as possible to collapse the handle means 14. Each wheel 45 and 46 is pulled downwardly until the locking cylinders 84 and 74 are unlocked, and the wheels 45 and 46 are then rotated through 90° to storage position, and re-locked. The wing nut 71 is then unscrewed to release the latch arm 68, and the struts 47 and 48 are pivoted about their respective pivot pins 55 and 65 so that the wheels 45 and 46 move inwardly toward each other. When the upper ends of the struts 47 and 48 have cleared the channel slots 56 and 66, each strut 47 and 48 is then pivoted in opposite longitudinal directions about its corresponding transverse pivot pins 51–53 and 61–63 so that the wheels are moved toward the housing 13. The wheel housing 13 includes a forward compartment having a shelf or floor 101 and an elongated wheel opening 102 in the right side of the housing 13 for receiving the right wheel 46 and strut 48 in their collapsed or stored position. In a similar manner, a rear storage compartment for the left wheel 45 comprises a floor 103 having an elongated wheel opening 104 in the left rear portion of the side wall of the wheel housing 13, for receiving the left wheel 45 and strut 47 in their collapsed or stored positions.

Figure 6:
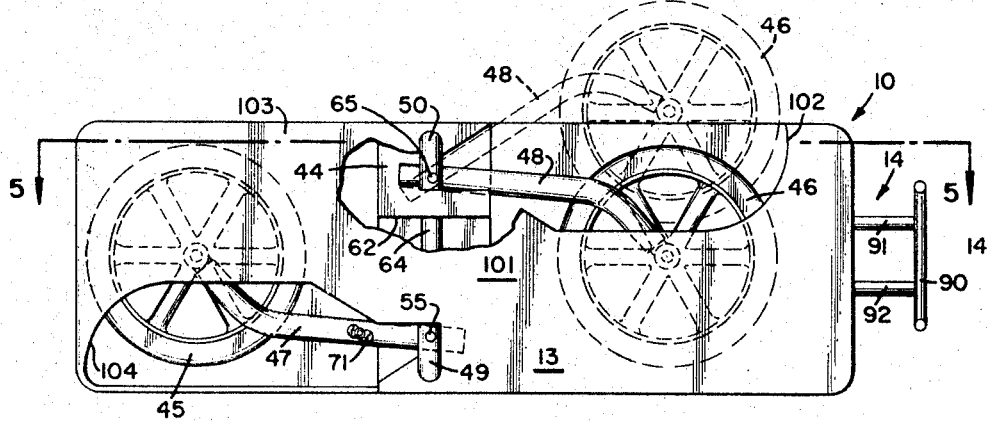
FIG. 6 is a fragmentary bottom plan view of the chassis showing the running gear in stored position and an intermediate position of the right wheel in phantom.

Since the strut 48 must be pivoted about its pivot pin 65 so that the upper portion of the strut 48 is in nearly vertical position before the upper end of the strut 48 clears its channel slot 66, as disclosed by the wheel position 46″ in phantom in FIG. 7, the wheel 46 will not be able to enter its wheel compartment if the position of the strut 48 is not changed as it pivots about its transverse pins 61 and 63. Consequently, as the strut 48 is pivoted about its transverse axis 61–63, it must again be swung outwardly about its pivot pin 65 after the upper end of the strut 48 has cleared the journal wall 62, and then pivoted into the opening 102 and upon the supporting platform 101. FIG. 6 illustrates the outward and inward positions of the right wheel 46 just prior to and just after the wheel has been introduced into the front wheel compartment in the housing 13. In this manner, each wheel 45 and 46 may be stored and substantially concealed at opposite ends and within the boundary limits of the chassis 11. Moreover, the wheels do not have to be stacked upon each other in stored position, so that the maximum utilization of space is employed.

Therefore, it is apparent that a golf cart 10 has been designed for maximum space utilization not only for the retractible wheels 45 and 46 but also for the arrangement of both the iron and wood clubs 27–28 and 21–22. Moreover, the iron clubs 27–28 are readily accessible and easily removed and replaced from the top of the cart without moving the clubs lengthwise. Both the location of the running gear 12 and the distribution of the clubs in the storage areas are designed to balance the total dead and live loads of the cart 10 about the wheel axles 83 and 73 to facilitate transportation. Furthermore, a running gear has been designed in which the wheels are rigidly held in running position, and provided with journal means including two different pivotal axes for ease in manipulating the struts 47 and 49 for collapsing and storing the running gear 12 within the cart.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:
1. A golf club cart comprising:
 (a) an elongated club storage chassis,
 (b) running gear including a pair of wheels and wheel struts, each strut having an inner end and an outer end,
 (c) strut mounting means on and beneath said chassis substantially mid-way of the length of said chassis,
 (d) said strut mounting means comprising journal means supporting said inner ends to pivot about axes transverse to the longitudinal axis of said chassis, so that each strut may be moved between a running position in which said strut depends from said chassis and a stored position in which said strut lies adjacent said chassis,
 (e) adjustable axle means connecting each wheel to the outer end of a corresponding strut so that the wheel axis may be locked in a first position transverse to said longitudinal axis when said strut is in running position and in a second position substantially normal to said first position,
 (f) means securing each strut in running position, and
 (g) means securing said running gear in stored position comprising recesses provided below said chassis on opposite sides of said transverse axes, each recess having an opening for receiving a corresponding wheel in stored position on opposite sides of said transverse axes.

2. The invention according to claim 1 in which said journal means also supports said inner ends to pivot about second axes normal to said transverse axes.

3. The invention according to claim 2 in which said means securing each strut in running position comprises a channel member holding and constraining said inner end against movement longitudinally of said chassis in running position, said inner end being adapted to pivot outwardly about said corresponding second axis to disengage said channel member for free pivotal movement about said corresponding transverse axis.

4. The invention according to claim 1 in which said adjustable axle means comprises an axle for each wheel, a locking cylinder fixed to each axle so that the axis of said locking cylinder is normal to said wheel axis, tubular means in the outer end of said corresponding strut telescopingly receiving said locking cylinder, and locking means for locking said cylinder within said tubular means in said first and second positions of said wheel axis.

References Cited
UNITED STATES PATENTS 2,681,232  6/1954  Womack ............ 280—41
2,597,386  5/1952  Schmid ............. 280—40
2,921,797  1/1960  Berglund et al. .... 280—41

KENNETH H. BETTS, *Primary Examiner.*

ROBERT R. SONG, *Assistant Examiner.*